United States Patent [19]
Jacobs et al.

[11] Patent Number: 5,424,052
[45] Date of Patent: Jun. 13, 1995

[54] PRODUCTION OF BORIC OXIDE

[75] Inventors: Paul F. Jacobs, Orange; Jacob J. Mu, Irvine; Richard P. Fisher, Hesperia, all of Calif.

[73] Assignee: U.S. Borax Inc., Valencia, Calif.

[21] Appl. No.: 157,755

[22] Filed: Nov. 24, 1993

[51] Int. Cl.6 .............................................. C01B 35/10
[52] U.S. Cl. ...................................... 423/278; 501/49
[58] Field of Search .................... 501/49; 423/278, 579

[56] References Cited

U.S. PATENT DOCUMENTS

| | | | |
|---|---|---|---|
| 3,479,137 | 11/1969 | Campbell, Jr. et al. | 501/49 |
| 3,582,272 | 6/1971 | Stanton | 423/278 |
| 4,243,423 | 1/1981 | Hohman | 501/29 |
| 5,194,337 | 3/1993 | Yoshida et al. | 501/49 |

Primary Examiner—Wayne Langel
Attorney, Agent, or Firm—James R. Thornton

[57] ABSTRACT

Amorphous boric oxide-containing product having about 85 to 92% $B_2O_3$ is produced by heating boric acid at an elevated temperature of up to about 275° C. to dehydrate the boric acid and form a molten glass which is cooled to a solid glassy product. This solid glass can be comminuted to produce a particulate product. Preferably the boric acid is heated at 220° to 275° C., with about 250° to 270° C. being most preferred. The process is readily adapted to a continuous process in which the boric acid is placed on a moving continuous steel belt and conveyed through a heating zone. The molten glassy product is cooled to form a solid glassy product which is removed from the belt and comminuted to a desirable particle size range.

14 Claims, No Drawings

PRODUCTION OF BORIC OXIDE

This invention relates to boric oxide and more particularly, it relates to the production of a novel amorphous boric oxide product having about 85 to 92% $B_2O_3$ and being essentially free of sodium.

BACKGROUND OF THE INVENTION

Boric oxide has many industrial applications, especially in the glass-making field where it is desirable to have a source of $B_2O_3$ without the undesirable presence of sodium, such as is contributed by borax, or excess water to evaporate, such as from boric acid. Boric oxide is generally produced on an industrial scale by the dehydration of boric acid at high temperatures such as in the range of about 700°–950° C. in a glass furnace fired by oil or gas. The molten glass is solidified by allowing a continuous ribbon to flow over chill-rolls and then crushed and screened to the desired particle size. See Kirk-Othmer, "Encyclopedia of Chemical Technology" Fourth Edition, Volume 4, Page 370, and U.S. Pat. No. 2,893,838. The product is a high purity (99% $B_2O_3$) amorphous solid, but it has the disadvantage of being hygroscopic, tending to rehydrate and cake under normal use and storage conditions. Further, it is expensive to manufacture due to the energy required to maintain the furnace at the required high temperatures. A lower $B_2O_3$ content product has been manufactured by reacting borax with sulfuric acid and then feeding the resultant mixture to a gas-fired furnace operating at 800°–900° C. The resultant amorphous product has a 95-98% $B_2O_3$ content but also contains residual sodium, which is undesirable in many glass-making applications. The process also has high energy requirements which make the product expensive to produce. See Supplement to Mellor's Comprehensive Treatise on Inorganic and Theoretical Chemistry, Volume V, Part A, Pages 171-174.

High-purity, crystalline boric oxide has also been produced such as by the slow dehydration of boric acid in an oven at 225°–250° C. over a period of from 7 to about 14 days. The use of sub-atmospheric pressures or organic liquid carriers have also been suggested. See U.S. Pat. Nos. 2,137,058, 2,186,257, 3,397,954, 3,582,272 and 4,098,196, Italian Patent 467,440 [Chemical Abstracts 47,4563(1953)], as well as the Kirk-Othmer and Mellor references discussed above, and Kemp, "The Chemistry of Borates," Part I, Pages 10-11 (1956).

British Patent 1,278,466 describes a process for preparing a granulated boric oxide by heating granulated ortho-boric acid in a gas diffusion apparatus, such as a porous plate through which is passed a stream of hot air, forming a fluidized bed. The product is a granulated boric oxide having a $B_2O_3$ content approaching 98%.

DESCRIPTION OF THE INVENTION

The present invention provides a novel boric oxide containing product having about 85-92% $B_2O_3$ as well as a process for producing the novel product. The process requires relatively low temperatures, thereby resulting in a substantial reduction in energy costs. It is readily adapted to a continuous process which will produce a highly useful boric oxide containing product on a continuous basis without the necessity of specialized equipment to withstand high temperatures or long residence times in the reaction zone.

The product is a stable, solid glass which, when comminuted to a desirable particle size, has less tendency to rehydrate than boric oxide of similar particle size. It is highly amorphous and nonporous and, when milled to about 60 mesh, has a bulk density of about 64 lbs. per cubic foot. It is essentially free of sodium and is much purer than many other commercially available dehydrated boric acid products. Since it is less hygroscopic than such commercial products it also has less tendency to cake. The energy savings achieved in producing the present product at the lower temperatures are substantial and therefore result in an economically desirable product which may be readily utilized in various glass making applications.

The process of this invention comprises heating boric acid at a temperature in the range of about 220°–275° C. for a period of time sufficient to dehydrate the boric acid and form a molten glass containing about 85-92% $B_2O_3$, preferably about 88-91% $B_2O_3$. The resultant molten glass is cooled to form a solid glassy product which may then be comminuted such as by milling to give a particulate amorphous boric oxide containing product which is essentially free from sodium contamination.

It is critical that the temperature to which the boric acid is heated does not exceed about 275° C. and a preferred temperature range is about 250° to 270° C. It has been found that boric acid goes through a glassy phase at a relatively low temperature of about 220° C. At 220° C. the molten batch is a pourable, bubbling, fluid melt with a viscosity of about 5,000 poises. As the temperature is increased and dehydration of the boric acid continues, the melt becomes viscous and unpourable. The viscosity increases very rapidly to 180,000 poises at 270° C. and at this point the $B_2O_3$ content of the melt reaches a plateau around 90-91% $B_2O_3$. The melt is then cooled to form a solid glassy product which may be milled as desired.

The process can be readily adapted to a continuous procedure such as by conveying a continuous stream of boric acid through a heating zone. A particularly useful arrangement is to use a continuous stainless steel belt (or alternatively, pan conveyor) on which a continuous, even layer of boric acid about 0.25 to 0.75 inch thick is spread. The belt conveys the boric acid through a heating zone in which heat is provided from above the layer of boric acid, either electrically or by natural gas, utilizing heating panels. The temperature of the panels is controlled so as to heat the boric acid no hotter than about 275° C. The residence time of the boric acid in the heating zone is controlled by the speed of the moving belt as well as the length of the heating zone. Generally, a residence time of up to about 0.5 hour, preferably about 5 to 15 minutes, will provide a boric oxide product containing about 90% $B_2O_3$. The moving belt, containing a layer of molten boric oxide glass, is cooled upon exiting the heating zone such as by spraying the underside of the belt with cooling water or air. As the layer of cooled boric oxide glass reaches the end of the belt and begins to curve over the pulley, it can be readily removed such as by scraping off the belt by use of a knife blade which spans the belt and rides on its surface under pneumatic or hydraulic loading. The cooled product is removed by the scraper as flakes of glass which can then be fed into a variety of milling equipment to be ground into particulate material of the desired mesh sizes.

The following examples illustrate the novel method of this invention using both a batch and continuous process.

EXAMPLE I

A 3/4 inch thick layer of granular boric acid was spread evenly in a 9×11½ inch stainless steel pan (Type 304). The pan was placed in a 270° C. preheated forced convection oven and maintained at 270° C. for 4.3 hours. The boric acid had turned into a complete melt after about three hours. The pan was then removed from the oven and the contents cooled rapidly by quenching in a cold water bath without getting the contents wet. The product separated from the pan and fractured into pieces during cooling. The pieces were ground using a TEEM-A-MILL ring and puck grinder. The resulting ground material was screened on a 30 and 200 mesh U.S. Standard screen. The +30 mesh material was re-milled and the −30+200 mesh material retained as finished product. The resultant product was found to contain 89.7% $B_2O_3$.

The above procedure was repeated twice except heating was for 6.5 hours at 270° C. to give additional batches of product. The three batches were combined and found to contain 89.9% $B_2O_3$.

EXAMPLE II

The procedure of Example I was repeated except the boric acid was heated at 270° C. for 3 hours. The resultant product was found to contain 86.98% $B_2O_3$.

EXAMPLE III

Boric acid was heated on a moving belt apparatus using a continuous 1050 SM stainless steel belt which was 2 feet wide and 18 feet long (0.6×5.5 meters). A screw feeder maintained a pile of boric acid at one end of the belt. The belt was driven at a velocity of 9 inches (23 cm) per minute and, as the belt moved, the boric acid was drawn through a gate which was 0.3 inches (0.8 cm) above the belt and 16 inches (41 cm) in width. This spread the boric acid evenly onto the moving belt as a band 0.3 inches (0.8 cm) deep and 16 inches (41 cm) wide, covering the entire length with boric acid. The moving belt was heated by four gas-fired panels suspended over a 68 inch (173 cm) section of the belt starting about 2 feet (61 cm) from the gate. Moving at 9 inches a minute, the boric acid was heated for 7 to 8 minutes as the belt passed under the heating panels. The heating panels were suspended across the belt at a height of 2 to 3 inches (about 5–8 cm) above the boric acid. The heat from each panel was dispersed evenly over the boric acid by means of a 1-inch (2.5 cm) thick fiber pad fixed to the underside of each panel. The temperature of the panels was about 760° to 870° C. and the boric acid was heated to about 270° C. As the boric acid passed under the first panel, water vapor was observed rising from it. The boric acid was converted to a bubbly molten liquid under the second and third panels as additional water was removed. The material become a very viscous molten glass under the fourth panel and formed a glass layer on the belt having a uniform thickness of 0.05 inches (0.1 cm). The airborne water vapor and volatile $B_2O_3$ liberated from the boric acid during heating was drawn away from the burner area by a canopy hood suspended over the burners. As the molten sheet exited the heating area, it was rapidly cooled by traversing a zone where the underside of the belt was sprayed with water. The solidified glass sheet cracked on cooling and released from the belt. As the cooled glass chips reached the end of the belt, a scraper removed the glass which dropped into a small hopper at the foot of the belt. The glass was crushed into particles ranging in size from −30 to +140 mesh by passing it through a cone crusher, screening through a 30 mesh screen and re-crushing the oversized material. Samples taken throughout the run showed that the $B_2O_3$ content of the product ranged from 89.5 to 90.7% $B_2O_3$,

EXAMPLE IV

An accelerated caking test was done on the product of this invention and a commercially available boric oxide product sold as Anhydrous Boric Acid HP having 98.5% $B_2O_3$, Duplicate wide-mouth polypropylene jars were filed to within 1¼ inch from the top with the product of this invention (−30+200 mesh) and the Anhydrous Boric Acid (60 mesh). An inverted jar lid was placed on the surface of the material as a pressure plate and a spring placed on the pressure plate. The jar lid was screwed on, tightly compressing the spring, exerting a pressure of about 4 psi. One jar containing each material to be tested was sealed with tape and placed in an oven at 135° F. The duplicate test jars were kept at room temperature.

After 24 hours the lid, spring and pressure plate were removed from each jar. The jars were carefully tilted to observe any caking of the contents. Both test materials kept at room temperature were free flowing. The product of this invention which had been kept at 135° F. was also free flowing. The commercial Anhydrous Boric Acid was caked and would not flow from the jar. Using a Proctor penetrometer with a 1/10 square inch tip, it was found that a pressure of 830 psi was required to break the cake.

Various modifications and changes to the invention can be made and, to the extent that such variations incorporate the spirit of this invention, they are intended to be included within the scope of the appended claims.

What is claimed is:

1. A method for producing a particulate amorphous boric oxide product having from about 85 to 92% $B_2O_3$ which comprises heating boric acid at a temperature in the range of from about 220° to 275° C. for a period of time sufficient to dehydrate said boric acid and form a molten glass containing about 85 to 92% $B_2O_3$, cooling said molten glass to form a solid glassy product, and comminuting said solid glassy product to form a particulate amorphous boric oxide product containing about 85 to 92% $B_2O_3$, said product being essentially sodium free.

2. A method according to claim 1 in which said boric acid is disposed on a moving belt.

3. A method according to claim 2 in which said boric acid is heated by an overhead source of heat.

4. A method according to claim 1 in which said boric oxide product contains about 88 to 91% $B_2O_3$.

5. A method according to claim 1 in which said boric acid is heated to a temperature of about 250° to 270° C.

6. A continuous process for producing a boric oxide product containing about 85 to 92% $B_2O_3$ which comprises feeding boric acid onto a moving belt, conveying said boric acid through a heating zone and heating said boric acid to a temperature in the range of about 220° to 275° C. for a period of time sufficient to dehydrate said boric acid and form a molten glass containing about 85 to 92% $B_2O_3$, cooling said molten glass to form a solid glassy product, removing said solid glassy product from said moving belt, and comminuting said removed product to form a particulate amorphous boric oxide product containing about 85 to 92% $B_2O_3$.

7. The process according to claim 6 in which said boric acid is heated at a temperature in the range of about 250° to 270° C.

8. The process according to claim 6 in which said boric acid is maintained in said heating zone for about 5 to 15 minutes.

9. The process according to claim 6 in which said moving belt is a stainless steel belt.

10. The process according to claim 6 in which said boric acid is heated by overhead heating panels.

11. The process according to claim 10 in which said moving belt has a 0.25 to 0.75 inch layer of boric acid.

12. The process according to claim 6 in which said boric oxide product contains about 88 to 91% $B_2O_3$.

13. The process according to claim 6 in which said molten glass is cooled by cooling the underside of said belt.

14. The process according to claim 6 in which said boric oxide is comminuted to a mesh size in the range of $-30+200$.

* * * * *